June 6, 1967 L. PEASE 3,323,565
SIDE CHIPPERS AND EDGER SAWS
Filed July 23, 1963 8 Sheets-Sheet 8
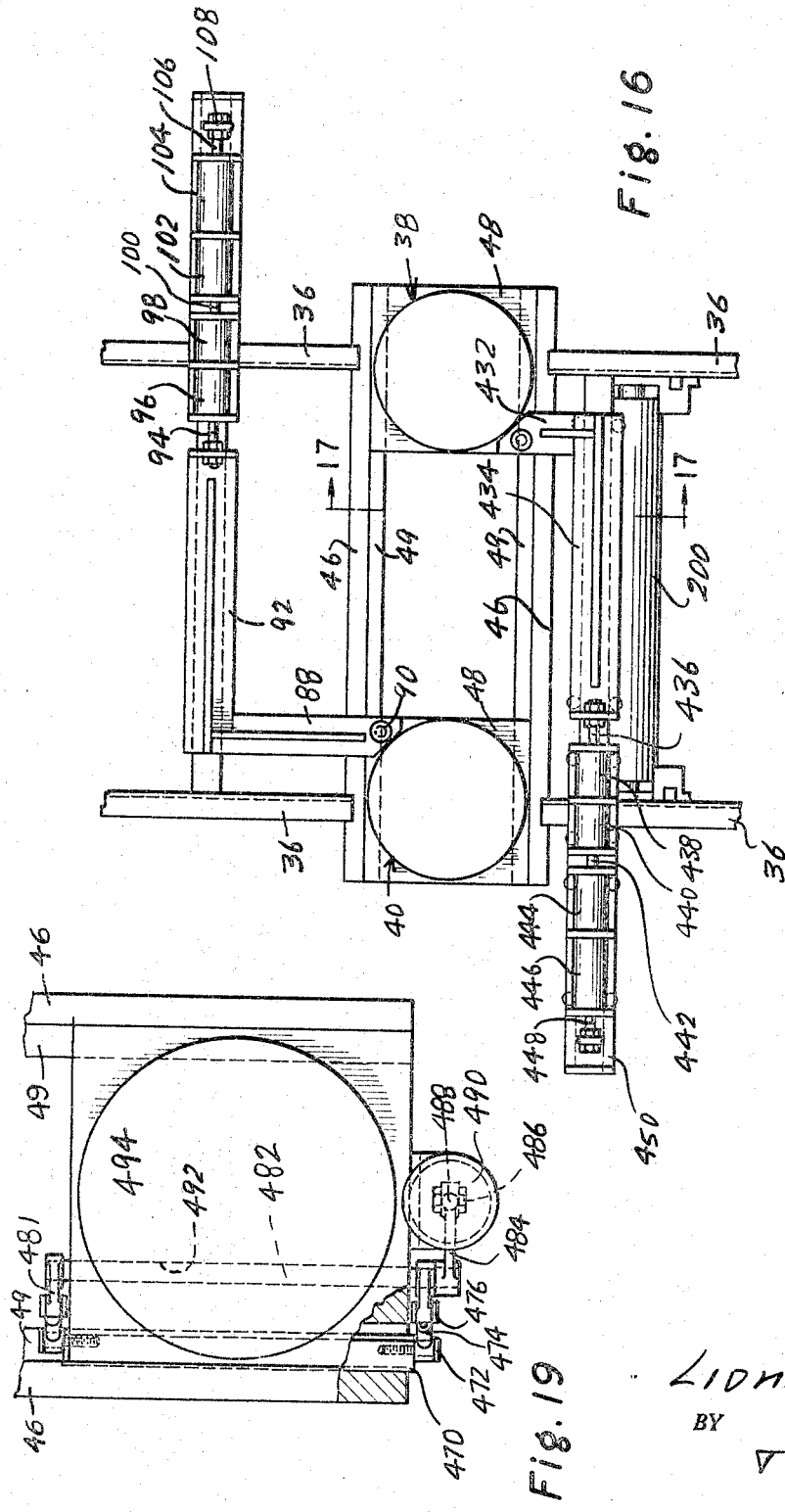
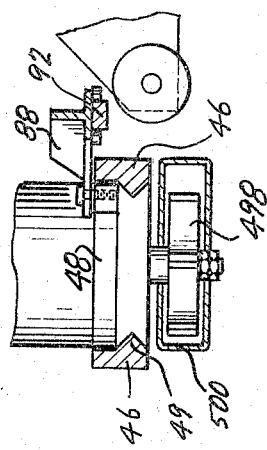
Fig. 16
Fig. 17
Fig. 19
INVENTOR.
Lionel Pease
BY United States Patent Office 3,323,565
Patented June 6, 1967

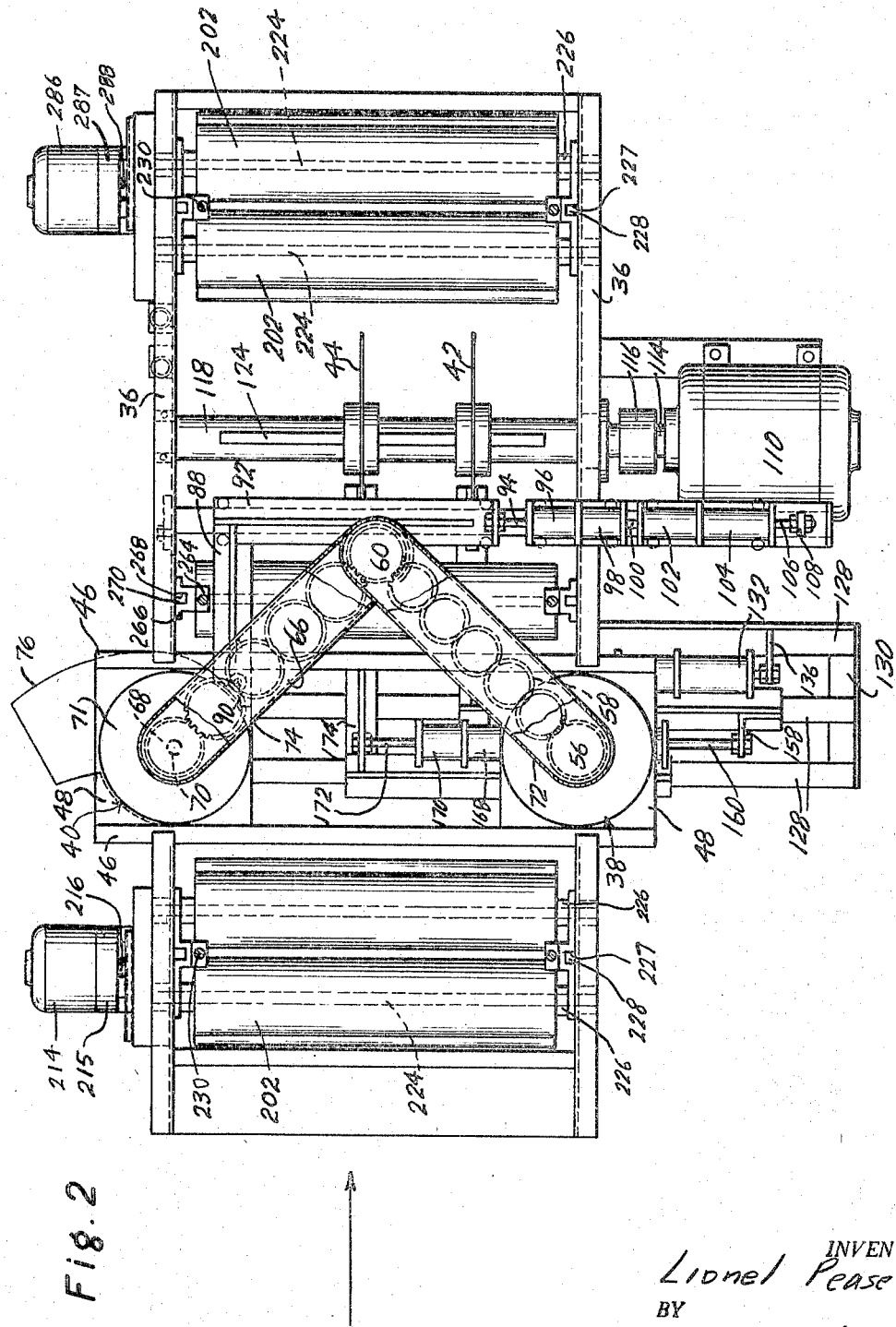

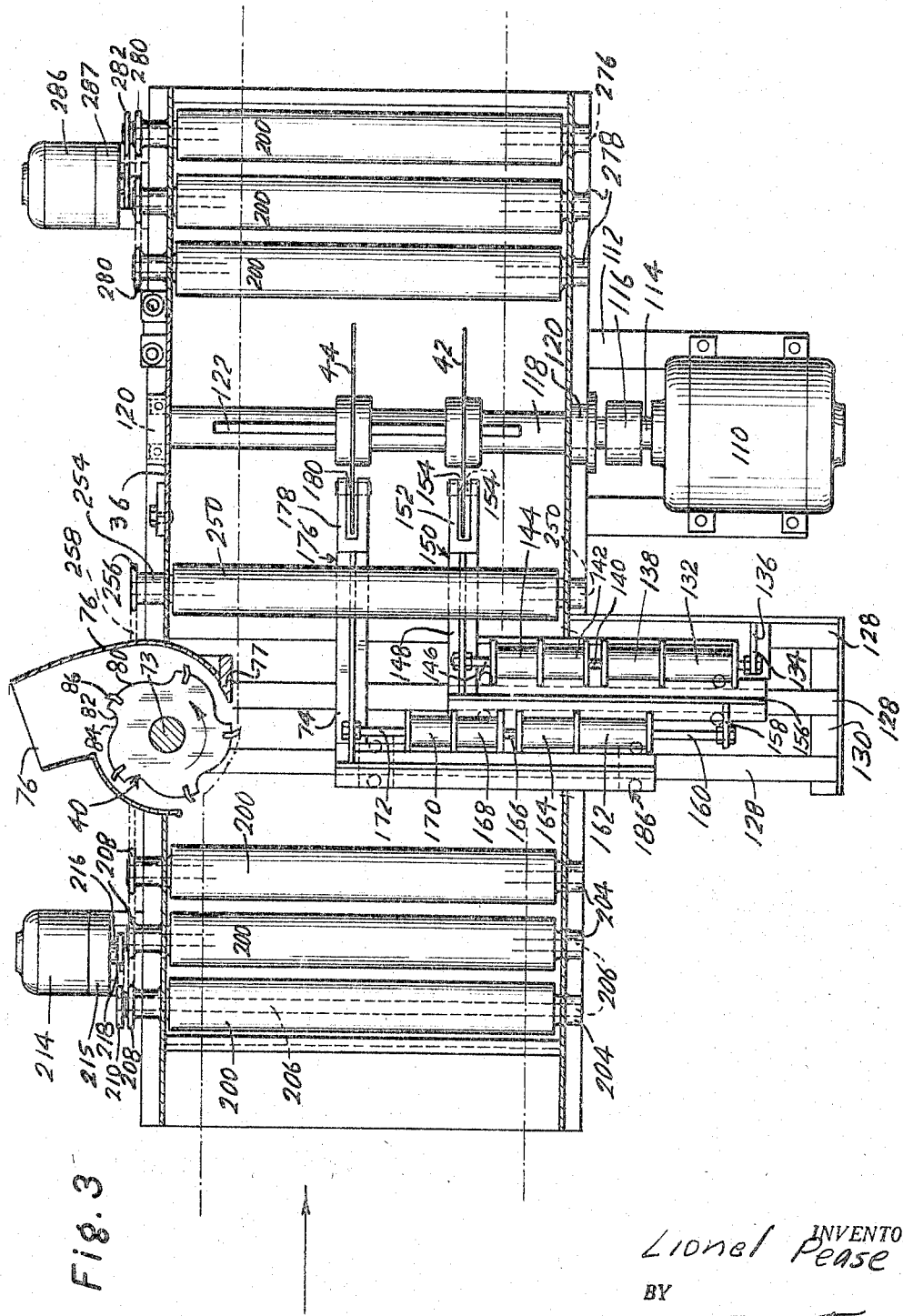

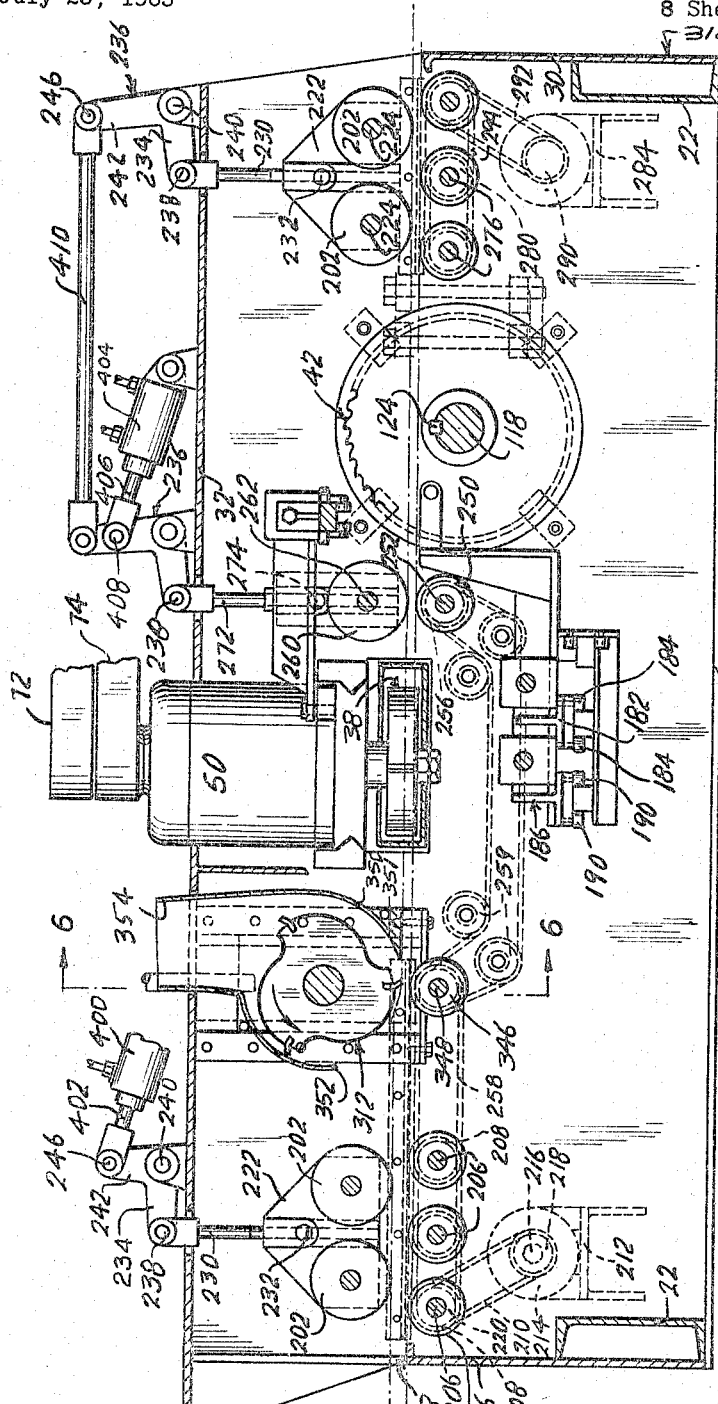

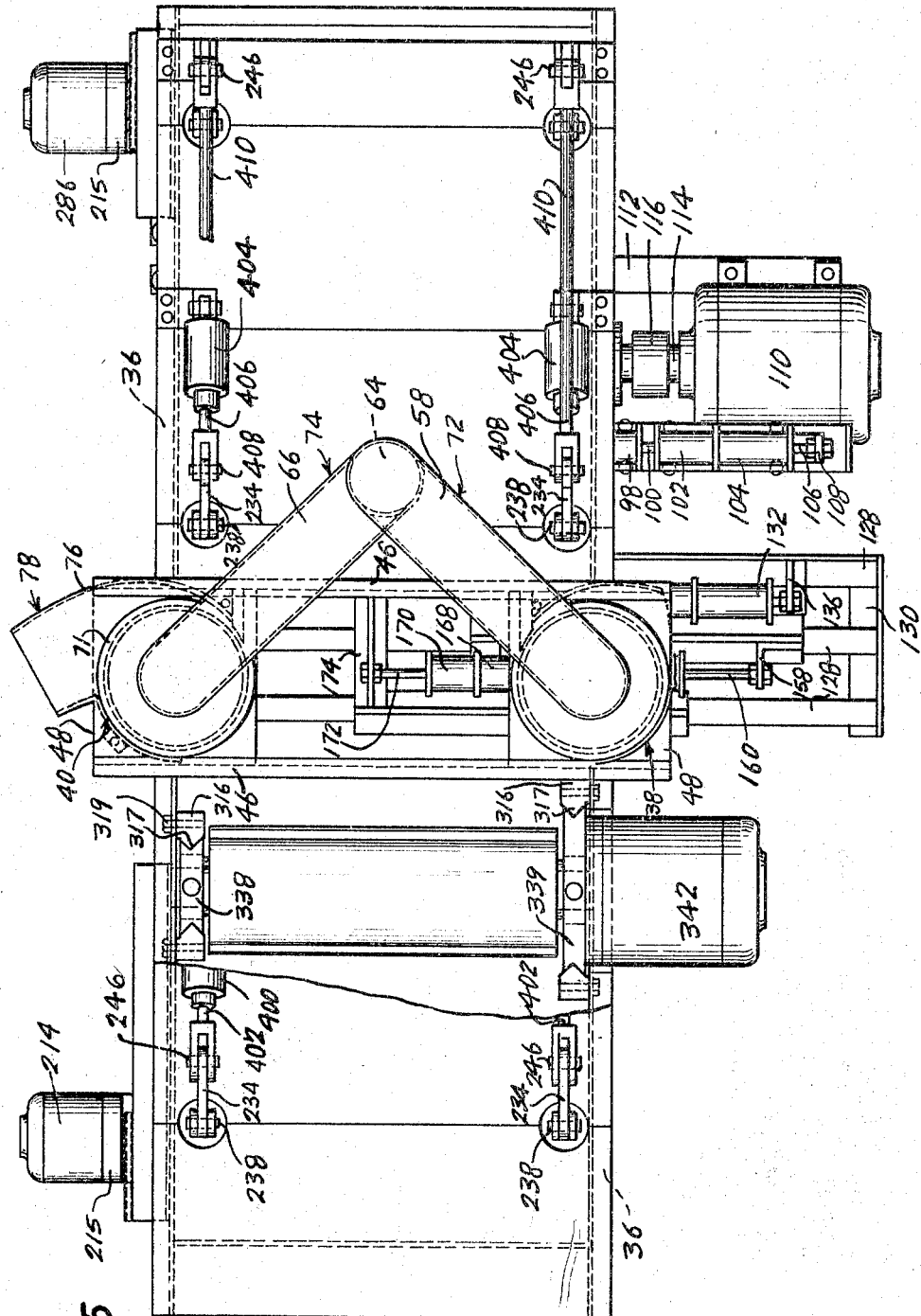

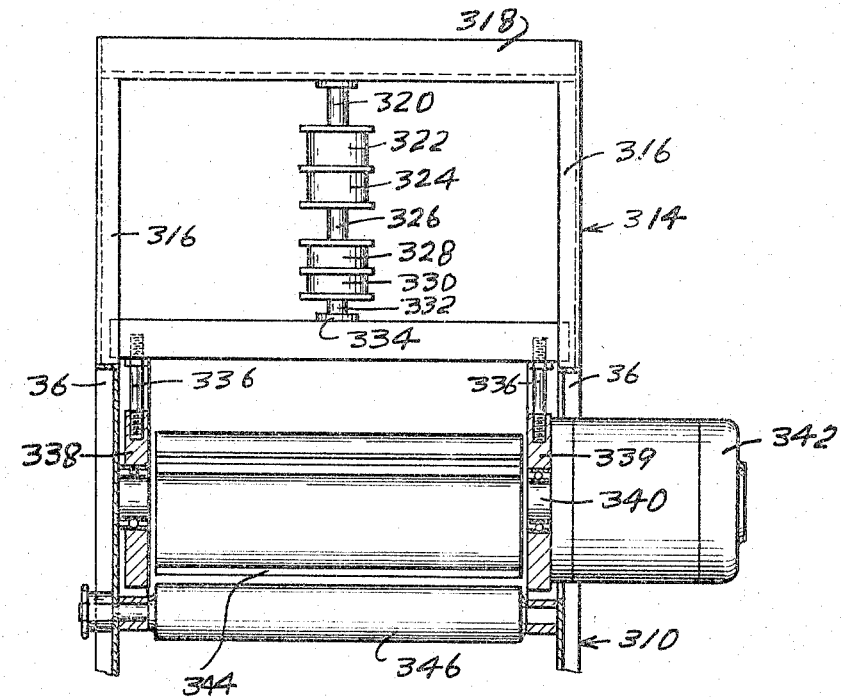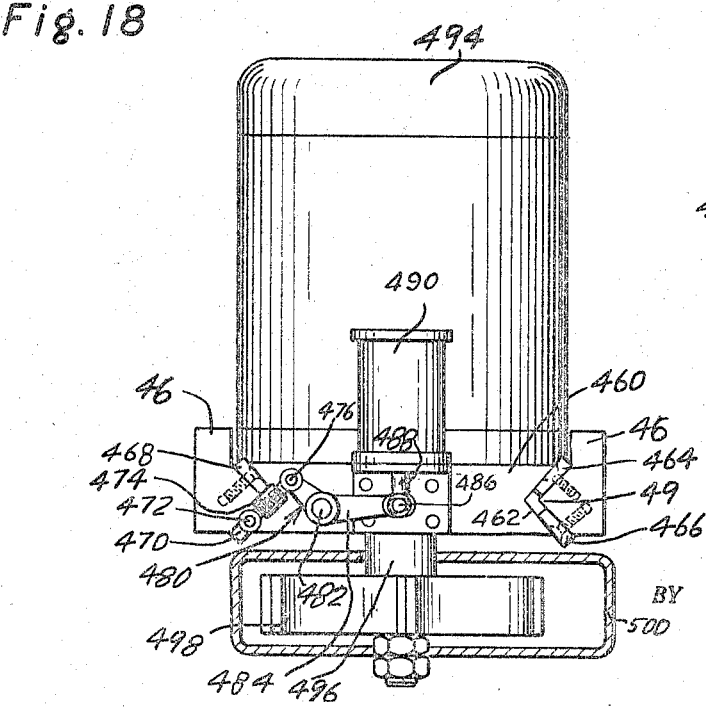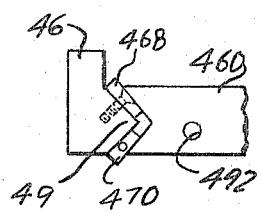

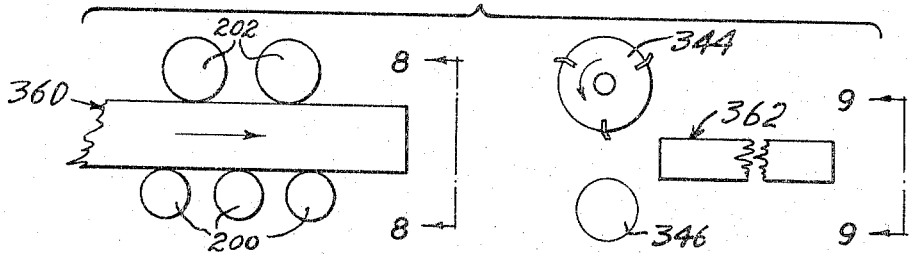
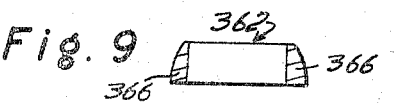
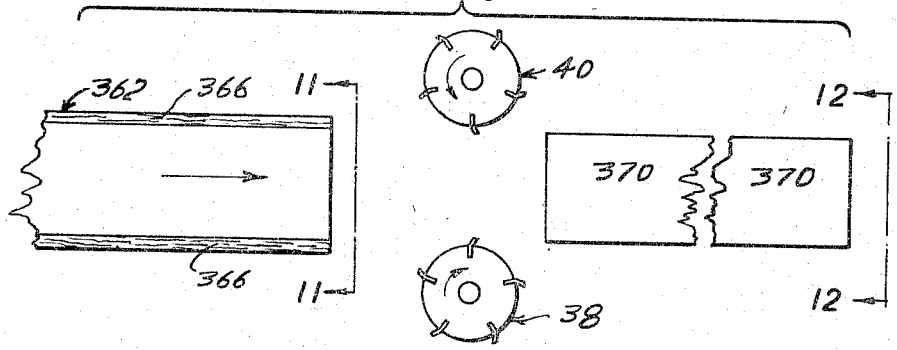
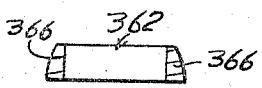
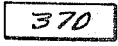
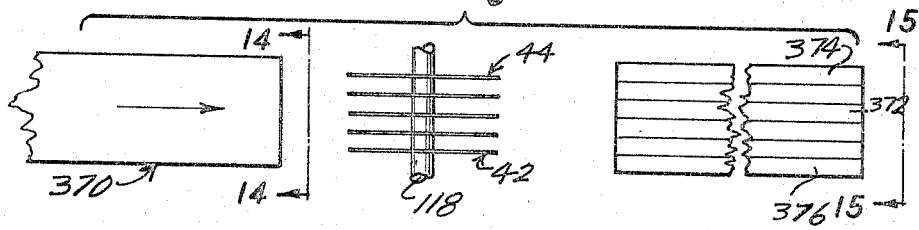
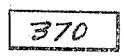
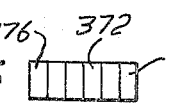

3,323,565
SIDE CHIPPERS AND EDGER SAWS
Lionel Pease, Seattle, Wash., assignor, by mesne assignments, to Thomas W. Secrest as trustee of the Creditors Committee of Mill Equipment, Inc., Seattle, Wash.
Filed July 23, 1963, Ser. No. 297,138
7 Claims. (Cl. 144—39)

This invention relates to the combination of side chippers and an edger and also to the combination of a top chipper, side chippers and edger.

In the processing of trees to make lumber, one of the first steps is to take slabs off the sides of the trees so as to remove the bark and some of the wood in order to have flat sides for cutting purposes. The disposal of the bark and the slabs of wood is quite often a problem. One way of disposal is to burn the slabs. Another way is to make the slabs into wood chips and then further process the wood chips into a useful material such as wood pulp or into particle board or chip core and the like. In a small operation it is usually not economical to go to the trouble and expense of having a chipping machine for converting the slabs into chips. Therefore, the slabs are burned and, in effect, the wood is deliberately destroyed. A further step in the processing of lumber is to pass cants through edging machine for reducing the lumber down to a certain desired size for trimming and finishing purposes.

This invention is for a machine for taking the slabs from the trees and removing wood from these slabs so as to have relatively large pieces of lumber with two parallel surfaces and also two sets of opposed parallel surfaces. One of the ways to do this is to take a slab of wood, remove the rounded portions on the top of the slab and also to remove the rounded portions on the side of the wood and then pass this through an edging machine to reduce it down to usable cants. In another phase, wood having two parallel surfaces, i.e., top and bottom parallel surfaces, but rounded edges, is passed through an edging machine to remove the rounded edges or the wane edges and then passed through edger saws to reduce down to smaller cants. The wood removed from the slabs and also from the wane edges is converted into chips and these chips may be used in the manufacture of pulp or particle board or chip core and the like. One extremely useful place for this invention is in the conversion of small logs into lumber and also into wood chips. For example, assume that a small log of approximately sixteen (16″) inches in diameter is to be converted into lumber and wood chips. The slabs are taken off the sides of the log. In effect, four slabs are taken off the side of the log so as to have a center core of substantially a square configuration in a lateral cross-sectional view. The center core can be worked to form smaller cants such as two-by-fours (2″ x 4″), four-by-fours (4″ x 4″), two-by-eights (2″ x 8″). Then, the plank can be passed through an edging machine to be converted into two-by-twos (2″ x 2″) or two-by-fours (2″ x 4″). The material removed from the rounded top portion of the slab and also the rounded side edges is removed by chipping machines and converted into wood chips. From this it is seen that there is substantially no wastage of the log or wood. The side slabs can be converted into small useful cants such as two-by-fours (2″ x 4″), one-by-twos (1″ x 2″) or one-by-threes (1″ x 3″). In certain instances where logs of thirty (30″) inches in diameter are available, the slabs may be converted into two-by-sixes (2″ x 6″) or even two-by-eights (2″ x 8″).

Accordingly, one of the objects and advantages of this invention is the provision of an apparatus for the conversion of waste material such as slabs into a useful material such as wood chips; the provision of a machine which has a high capacity for converting waste material into a useful product; a machine which is capable of handling many sizes of slabs from a small tree such as six inches in diameter to slabs from relatively large trees such as thirty and thirty-six inches in diameter; a machine which is compact and relatively small in size and occupies only a small floor area; a machine which, for its high output capacity and usefulness, has relatively few moving parts and is of a straight-forward design; a machine which requires a low amount of maintenance; and, a machine which is relatively inexpensive to manufacture.

These and other important objects and advantages of the invention will be more particularly brought forth upon reference to the accompanying drawings, the detailed specification and the appended claims.

In the drawings:

FIGURE 1 is a side-elevational view, with one side covering plate removed, to show the components of a specific embodiment of a side chipper and edger saw machine constructed in accordance with preferred teachings thereof;

FIGURE 2, taken on line 2—2 of FIGURE 1, is a horizontal cross-sectional view looking at the machine and illustrates some of the main components such as the upper pressure rolls, the gear train for timing the side chippers, motors, setworks and the edger saws;

FIGURE 3, taken on line 3—3 of FIGURE 1, is a horizontal cross-sectional view looking at other components of the machine such as the lower feed rolls, the side chippers, and the mechanism for moving the edger saws;

FIGURE 4 is a side-elevational view of another embodiment of the invention, with the side cover plate removed, and illustrates a top chipper, side chippers and edger saws;

FIGURE 5 is a plan view with part of the top removed to illustrate the top chipper, and also illustrates the side chippers and the apparatus for raising and lowering the pressure rolls;

Figure 1:
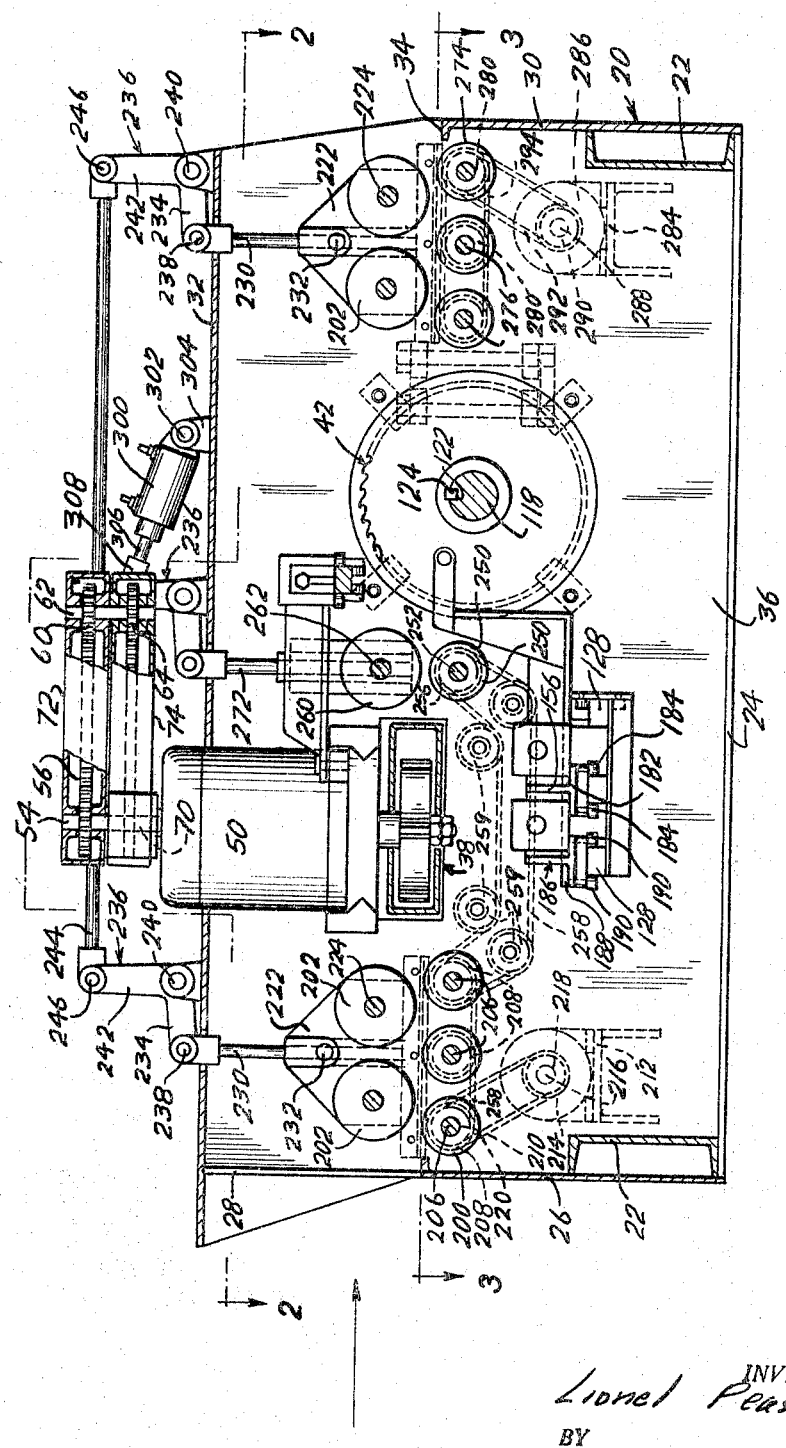

FIGURE 6, taken on line 6—6 of FIGURE 4, is a front view looking into the top chipper, and shows the top chipper with setworks and stabilizer roll;

FIGURE 7 is a schematic elevational view illustration of a slab of wood between the entering feed rolls and which slab is being fed into the top chipper, and also illustrates the slab of wood after it has passed the top chipper;

FIGURE 8, taken on line 8—8 of FIGURE 7, is an end view looking at the slab of wood upon passing to the top chipper;

FIGURE 9, taken on line 9—9 of FIGURE 7, is an end view looking at the slab of wood after it has passed the top chipper and after the rounded upper portion has been removed but with the wane coating or rounded edges still on the slab;

FIGURE 10 is a schematic plan view illustrating the slab of wood prior to entering the side chippers and also illustrates the slab of wood after it has passed through the side chippers;

FIGURE 11, taken on line 11—11 of FIGURE 10, is an end view illustration of a slab of wood prior to entering the side chippers and shows the slab as having wane coating or rounded edges;

FIGURE 12, taken on line 12—12 of FIGURE 10, is an end illustration of a slab of wood after it has left the side chippers and is now a cant with two sets of opposed parallel faces;

FIGURE 13 is a schematic plan view illustration of the cant prior to passing through the edger saws and also illustrates the cant after it has passed through the edger saws;

FIGURE 14, taken on line 14—14 of FIGURE 13, is an end view illustration of the cant before it passes through the edger saws;

FIGURE 15, taken on line 15—15 of FIGURE 13, is an end view illustration of the cant after it has passed through the edger saws and shows the same as being converted into a number of smaller cants;

FIGURE 16 is a fragmentary plan view looking down on the means for moving both of the side chipper heads to accommodate various size slabs;

FIGURE 17, taken on line 17—17 of FIGURE 16, is a fragmentary view illustrating the gibs for guiding the side chipper;

FIGURE 18 is a side elevational view illustrating the locking device for positioning the side chippers;

FIGURE 19 is a plan view looking down on a side chipper and the locking device for the side chipper; and, FIGURE 20 is an enlarged fragmentary side elevational view illustrating the locking device for positioning the side chipper.

In the drawings it is seen that the invention comprises a side chipper and edger saw combination 20. This combination 20 has a frame work comprising of two lateral end channel members 22, a base 24, a front face 26 with an opening 28 in the front, a rear face 30 which extends approximately half way from the base 24 to a top plate 32 so as to provide an opening 34, and sides 36. It is to be realized that the frame and skin members may be varied for various sizes of machines.

The two main components of the combination 20 are side chippers and the saws. In FIGURE 2 it is seen that there is, from the flow of travel of the slab, a right side chipper 38 and a left side chipper 40. Also, there is a right saw 42 and a left saw 44.

The structure for operating the two chippers 38 and 40 comprises two lateral spaced apart support members 46. Positioned between these support members 46 are plates 48. It is seen that on the plate 48, positioned above the chipper head 38, that there is mounted an electric motor 50 having a depending output shaft 52. On the output shaft 52 is mounted the chipper head 38. Also, there is an upper output shaft 54. Mounted on the output shaft 54 is a gear 56. The gear 56 is the first gear in a gear train 58. The last gear in the gear train 58 is gear 60 and is mounted on shaft 62. On the lower part of the shaft 62 is mounted a gear 64 which is the first gear in the gear train 66. The last gear in the gear train 66 is identified as gear 68. The gear 68 is mounted on a shaft 70. The shaft 70 depends from the gear 68. The shaft 70 is an output shaft of a motor 71. Also, the motor 71 has a depending output shaft 73. The chipper head 40 is mounted on the output shaft 73. Encompassing the gears 56 and 60 in the gear train 58 is a housing 72. The shaft 62 is partly in the housing 72 and also partly in the housing 74. The housing 74 encompasses the gears 64 and 68 in the gear train 66. It is to be realized that the shaft 73 is journaled in a bearing mounted on the plate 48. The journaling of shafts is well-known and old in the art.

Around the chipper head 40 it is seen that there is a shroud or housing 76 having an outlet opening 78. It is to be realized that there is a similar shroud for the chipper head 38. The reason for the shroud is readily understood as there must be a means for exhausting the wood chips or removing the wood chips from the vicinity of the machine 20. For example, with wood passing through the machine 20 at a lineal speed of seven hundred and fifty (750) feet per minute, it is seen that a large volume of wood chips is capable of being made in a short period of time. If these chips are not readily removed, it is not possible to operate the machine. The shroud is so constructed that when the chipper head is rotating that a vacuum or a low pressure region is created so that the wood chips are sucked or forced into the shroud to be exhausted. On the downstream side of the chipper there is a shoe 77. This shoe assists in separating the wood chip from the wood slab.

The chipper heads 38 and 40 have an external periphery 80 and a tooth portion 82. It is seen that the chipper head 82, just in front of the tooth portion 80, is recessed at 84. Back of the tooth portion 82 there is a chipper tooth 86. The construction of the chipper head is not part of the invention. One type of chipper head which may be satisfactorily employed is disclosed in the patent to E. M. Key, No. 2,899,992, issuing date of Aug. 18, 1959.

It is seen that the chipper heads rotate in the same direction as the flow of the wood, i.e., the chipper heads cut with the wood and not against the wood. Also, there is a motor 50 for the chipper head 38 and a motor 71 for the chipper head 40. These motors drive the chipper heads and if one motor becomes overloaded the other motor may transmit power through the gear trains to the overloaded motor and associated chipper head. The gear trains 58 and 66 in addition to transmitting power between the motors 50 and 71 also functions as a timing device for the chipper heads so that the cutting teeth of the two chipper heads strike or hit wood simultaneously. With the teeth striking opposite sides of the slab of wood at the same time, the slab of wood is more firmly positioned between the two cutter heads making it possible to more evenly remove chips from the sides of the slab.

It is seen that the plate 48, juxtapositioned with respect to the cutter head 40, is free to move on the lateral gibs 46. Each of these gibs 46, in a lateral cross-sectional view, show an inwardly directed triangular guide 49. An arm 88 is pinned at 90 to the plate 48. The arm 88 is also integral with an arm 92. The arms 88 and 92 are at right angles to each other. The arm 92 connects with the plunger 94 of pneumatic cylinder 96 which is in a back-to-back relationship with pneumatic cylinder 98. The pneumatic cylinder 98 connects with the plunger 100 which in turn connects with a pneumatic cylinder 102. The cylinder 102 is in a back-to-back relationship with the cylinder 104. The cylinder 104 connects with the plunger 106. The cylinder 102 is fixed to a supporting arm 108. The supporting arm 108 is attached to the frame of 20 and provides a support for the pneumatic cylinders 96, 98, 102 and 104. These cylinders may have various strokes. For example, the cylinder 96 may have a one (1″) inch stroke; 98 may have a two (2″) inch stroke; 102 may have a three (3″) inch stroke; and, 104 may have a four (4″) inch stroke. By extending the cylinders in various combinations, it is possible to move the chipper head a maximum of ten (10″) inches. It is seen that the chipper head 38 is a stationarily positioned chipper head and that the chipper head 40 moves laterally in the apparatus 20. The gear trains 58 and 66 make possible the movement of the chipper heads 40 and 38 relative to each other while maintaining a precise angular timing between the two chipper heads.

It is to be remembered that the strokes of the plungers 96, 98, 102 and 104 may be different than above stated for different size machines. It is seen that there is an electric motor 110 mounted on lateral supports 112. The motor 110 has an output shaft 114. A coupler 116 connects the output shaft 114 with a saw arbor 118. Mounted on this arbor 118 are the two saws 42 and 44. The arbor 118 is journaled in bearings 120 on each side of the apparatus 20. It is seen that in the arbor 120 there is a keyway 122. Also, it is seen that a key 124 connects the saws to the arbor 118. It is to be realized that the saws fit rather loosely on the key 124 so that the saws can be moved on the arbor 118.

The saws 42 and 44 may be moved on the arbor to assume different positions. The structure for carrying out this movement comprises a supporting frame-work having three supporting members 128. These members project laterally from the side of the apparatus 20. An end tie member 130 ties together the three members 128. It is to be realized that the members 128 also function as guides for the pneumatic cylinders mounted on them. It is seen that there is a first cylinder 132 having a plunger 134. This plunger connects with a base or tie member 136 which is integral with one of the supporting members 128. The base or tie member 136 may be welded or attached by other suitable means such as a nut and a bolt to the supporting member 128. The cylinder 132 is in a back-to-back relationship with the cylinder 138. In the cylinder 138 there is a plunger 140. The plunger 140 connects with the cylinder 142. The cylinder 142 is in a back-to-back relationship with the cylinder 144. In the cylinder 144 there is a plunger 146. On the end of the plunger 146 there is a lever arm 148, at right angles to the plunger 146 and which lever arm splits at its outer end into a clevis 150 having two spaced apart arms 152. On the inner face of each arm 152 there is a finger or pad 154. The finger 154 contacts the saw 42. It is seen that by moving the plungers in the pneumatic cylinders that it is possible to move the saw 42. The cylinder 144 may have a one (1") inch stroke; 142 a two (2") inch stroke; 138 a three (3") inch stroke; and, 132 a four (4") inch stroke. It is seen that it is possible to vary the distance of the saw a maximum of ten (10") inches with this arrangement of strokes. Again, it is possible for the plungers to have different strokes for different saw conditions.

The arm 146 connects with an arm 156. The arm 156 is parallel to the supports 128 and also to the line of cylinders 132, 138, 142 and 144. On the end of the arm 156 there is a laterally projecting arm 158. This arm 158 is tied to a plunger 160. The plunger 160 connects with a pneumatic cylinder 162. The pneumatic cylinder 162 is in back-to-back relationship with the pneumatic cylinder 164. The pneumatic cylinder 164 connects with the plunger 166. The plunger 166 connects with the pneumatic cylinder 168 with which pneumatic cylinder is in a back-to-back relationship with the pneumatic cylinder 170. The pneumatic cylinder 170 connects with the plunger 172. The plunger 172 is tied to an arm 174. The arm 174 is at right angles with respect to the supporting arm 128 and also with the plunger 172. The outer end of the arm 174 splits into a clevis 176. The clevis 176 has two arms 178. On the inner face of each arm 178 there is a finger or pad 180. It is seen that the clevis 176 can move the saw 44. The stroke of these cylinders may be as follows: The cylinder 170 may have a stroke of one (1") inch; 168 a stroke of two (2") inches; 164 a stroke of three (3") inches; and, 162 a stroke of four (4") inches. This makes a total maximum stroke of ten (10") inches for moving the saw 44. It is to be remembered that the saw 42 can be moved ten (10") inches. In effect, and in summation, the movement of the saw 44 can be moved a maximum of twenty (20") inches with this particular set of these two banks of automatic cylinders. Again, it is possible for the plungers to have different strokes for different saw conditions.

It is seen that there are provided guides for guiding the arms 148 and 174 and also for guiding the cylinders. More particularly, the connecting arm 156 has a base 182 and depending legs 184. It is seen that the connecting arm 156 rides on the middle support 128. The base 182 and the legs 184 firmly position the banks of cylinders 132, 138, 142 and 144 and the arm 156. Also, connecting with the bank of cylinders 162, 164, 168 and 170 is an arm 186. This arm 186 has a base 188 and depending legs 190. It is seen that the base 188 and the guides 190 in conjunction with the support 128 firmly position the adjacent cylinders and also assist in pushing the arm 174. The arm 186 may be connected to the cylinder 162 by means of welding or other suitable mechanical devices.

It is seen that on the feed or inlet side of the apparatus 20, and before the chipper heads 38 and 40, there are pressure or feed rolls. There are three lower rolls 200 and two upper rolls 202. The lower rolls 200 are journaled at 204 in bearings in the side of the apparatus 20. These rolls have a shaft 206. On the shaft 206 there are mounted sprockets 208. On the shaft 206 of the first roll there is also mounted a small sprocket 210. It is seen on the side of the apparatus 20 there is mounted a supporting arm 212. On the supporting arm 212 there is an electric motor 214 having an output shaft. This shaft connects with a mechanism 215 for driving the shafts 206 and the rolls 200. The mechanism 215 may comprise a worm gear drive, a governor and brake or an inertial escape mechanism so as to drive the shafts 206 and the rolls 200 at a constant velocity without acceleration. This provides a non-overruning feed for the chippers and the saws so that the feed rolls will not be influenced by the pulling action of the chipping knives operating against the slab or cant. The mechanism 215 has an output shaft 216. On the output shaft 216 there is a sprocket 218. A chain 220 connects the sprocket 218 and the sprocket 210 so that the sprocket 218 is in driving relationship with the sprocket 210.

The rolls 202 are carried on two spaced apart carrying plates 222. These rolls 202 have shafts 224. The shafts 224 are journaled in the bearings 226 attached to the carrying plate 222. The supporting plate or carriage 222 has a vertical groove 227 in the central portion. On the inside face of the sides 36 there is a guide 228. Actually, the groove 227 may be considered a keyway and 228 may be considered a key for guiding the carriage 222. Connecting with each side of the carriage 222 is a vertical rod 230. The rods 230 may be connected to the carriage 222 by means of a pin 232 so that it is possible for the rod and carriage to rotate with respect to each other. The upper end of the rod 230 connects with an arm 234 of bell crank 236. A pin 238 connects 230 with 234. The bell crank 236 is pivoted in a pillow block 240 on the upper surface of the apparatus 20. The bell crank 236 comprises another arm 242. The arm 242 connects with an arm 244 by means of pin 246.

Positioned, with respect to the flow of the lumber, behind the side chippers 38 and 40 is a lower fixed roll 250 having a shaft 252 which is journaled in bearings 254 positioned on the inner face of the sides 36 of 20. On the shaft 252 is a sprocket 256. A chain 258 runs around and is in contact with the sprockets 208 on the shafts for the rollers 200 and also the sprocket 256. In FIGURE 1 the chain 258 runs around idler sprockets 259. It is seen that the motor 214 drives all of these sprockets for insuring that the lumber flows through the machine 20. Positioned above the roller 250 is a roller 260 having a shaft 262. The shaft 262 is journaled in bearings 264 which are carried by a plate 266. The plate 266 has a groove 268 which may be considered to be a keyway. There are two of these plates 266. On the inner face of the sides 36 is a key 270. The keyway 268 fits with the key 270 so that in effect 270 is a guide. Attached to the plate 266 is a rod 272. This rod is rotatably pinned at 274 to 266. The upper end of the rod 272 is pinned to a bell crank 236 in a manner previously described with respect to rod 232 and bell crank 236. Because the construction is the same, the same reference numerals will be used for the bell crank 236 associated with the roller 260 as for bell crank 236 associated with rollers 202.

On the outlet side of 20 or downstream from the saws 42 and 44, there is a set of output rolls. There are three lower rolls 274 having shafts 276. These shafts 276 are journaled in bearings 278 on the inner face of the sides 36. On each of shafts 236 there are sprockets 280. On the last shaft 276 there is a smaller sprocket 282. On the outer face of the side 36 there is a support 284 and mounted on the support 284 there is an electric motor 286.

The motor 286 has an ouput shaft. This shaft connects with a mechanism 287 for driving the shafts 276 and the rolls 274. The mechanism 287 may comprise a worm gear drive, a governor and a brake or an inertial escape mechanism 50 as to drive the shafts 276 and the rolls 274 at a constant velocity without acceleration. This provides a non-overrunning feed so that the output rolls will not be influenced by the pushing action of the chipping knives operating against the slab or cant. On the shaft 288 there is a sprocket 290. A chain 292 runs between the sprockets 290 and 282. A chain 294 runs around the sprockets 280 of the three rolls 274 so that in effect the motor 286 drives these three rolls. Positioned above the rolls 274 are rolls 202. The rolls 202 are carried on an assembly the same as the rolls 202 postioned above the rolls 200. Therefore, the same reference numerals will be used for this structure. It is seen that the rolls 202 associated with the rolls 274 are connected with a bell crank 236. The rod 244 connects with the front bell crank 236 and the rear bell crank 236 and also the middle bell crank 236. It is seen in FIGURE 1 that the rod 244 connects with the forward bell crank 236 on that side of the arm 244 opposed to the arm 234, while the rod 244 connects with the rear bell crank 236 on the same side of the arm 242 as is the arm 234. This connection is necessary in order to insure that the bell cranks 236 raise and lower the respective rolls 202 and 260. It is seen that a pneumatic or hydraulic cylinder 300 connects with the middle bell crank 236. The cylinder 300 is pivoted at 302 to a lug 304 on top of the upper plate of 20. The cylinder 300 has a plunger 306. This plunger 306 connects with a fitting 308 which connects with the middle bell crank 236. Naturally, there are fluid pressure lines leading into the cylinder 300 as well as into previously described cylinders 96, 98, 102, 104, 132, 133, 142, 144, 162, 164, 168 and 170. In many instances these are not shown as it is well understood that in order to actuate a hydraulic or pneumatic cylinder that it is necessary to have pressure lead lines. It is seen that by extending the plunger 306 in the cylinder 300 that the rollers 202 and 260 are lowered so as to be in closer contact with the rollers 200, 250 and 274. Conversely, by retracting the plunger 306 the rollers 202 and 260 are raised.

In FIGURES 4, 5 and 6 there is illustrated another preferred species of the invention and which species comprises in combination a top chipper, side chippers and edger saws. This species is identified by reference numeral 310. Numeral 310 includes all of the structure of 20 with the addition of a top chipper structure 312. The top chipper 312 structure comprises a superstructure 314 on top of 310. More particularly, it is seen that this superstructure comprises two vertical frame members 316 and a horizontal cross member 318. The vertical frame members 316 are positioned on top of the sides 36 of 310. The frame members 316 function as guides. The frame members 316 are gibs which have an inwardly directed wedge 317. The gibs 316 are bolted to the sides 36 by bolts 319. Attached to the lower central portion of the horizontal member 318 is a plunger 320. The plunger 320 connects with a pneumatic or hydraulic cylinder 322. The cylinder 32 is in a back-to-back relationship with a cylinder 324. The cylinder 324 has a plunger 326 which connects with a cylinder 328. The cylinder 328 is in a back-to-back relationship with a cylinder 330. The cylinder 330 has a plunger 332 which is fixed to a horizontal movable cross member 334. It is seen that 334 is positioned by the gibs 316 and the wedges 317. Depending from each end of 334 is an integral rod 336. The rod 336 connects with a bearing 338 and a bearing 339. The bearing 338 is recessed to fit with the gibs 316. Also, the bearing 339 is recessed to fit with the gibs 316. The bearing 339 is larger than the bearing 338. The bearings 338 and 339 journal a shaft 340. The shaft 340 may be considered to be an output shaft of electric motor 342 and also part of the shaft for chipper head 344. In effect, the superstructure 314 and the bearing 339 carry the electric motor 342 and also the chipper head 344. Positioned below the chipper head 344 is a roller 346 having a shaft 348. It is to be realized that the shaft 348 is journaled in the side of the sides 36.

The chipper head 344 may be similar to the chipper heads 38 and 42 or similar to the chipper head referred to in Patent No. 2,899,992.

It is seen that surrounding the chipper head 344 that there is a shroud 350 having an opening 352 above the roll 346. Also, there is an outlet opening 354. The purpose of this shroud 350 is readily understood as with the chipping away of the wood and the formation of wood chips it is necessary to have a means for disposing of these chips. The configuration of the shroud and the chipper function as a means for creating a vacuum or reducing pressure so that the wood chips are sucked into or forced into the shroud. It is to be realized that a suction or vacuum means is conected with the outlet opening 354 so as to remove the wood chips. On the downstream side of the chipper there is a shoe 351. The shoe assists in separating the wood chips from the slab of wood.

In 310 there is a slightly different arrangement for operating the pressure rolls as compared with 20. More particularly, the pressure rolls 202 associated with the lower rolls 200 are operated by a single pneumatic or hydraulic cylinder 400 having a plunger 402. The plunger 402 connects with the bell crank 236 by means of pivot 246. It is to be realized that the other end of the cylinder 400 is anchored or positioned with respect to 310. The means for raising and lowering the pressure rolls 260 and the pressure rolls 202 downstream from the saws 42 and 44 are substantially the same as in FIGURE 20. There is a hydraulic cylinder 404 having a plunger 406. The plunger 406 is pinned at 408 to the bell crank 236 associated with the upper pressure roll 260. This bell crank is connected by a rod 410 with a bell crank 236 associated with the rolls 202 downstream from the saws 42 and 44. It is seen that by extending the plunger 402 the rolls 202 are elevated. Also, it is seen by extending the plunger 406 that the roll 260 and the rolls 202 are lowered by retracting the plunger 406 that the roll 260 and the rolls 202 are elevated.

In order to more fully understand the operation of the machines 20 and 310, reference is made to FIGURES 7 through 15. In FIGURE 7 there is illustrated a schematic view of an input slab 360. This slab is illustrated as passing between the rollers 200 and 202 and between the top chipper 344 and a roller 346 to form a slab 362. The slab 360 has a rounded top portion 364 and rounded sides 366. The slab 360 passes between the roller 346 and the top chipper 344 so that the top portion 364 is removed to form wood chips. The slab 360 is illustrated in FIGURE 8. Upon leaving the top chipper 344, there is a slab 362 having the rounded edges 366 or wane coating 366 as illustrated in FIGURE 9.

In FIGURE 10 there is illustrated the slab 362 passing between the side chippers 38 and 40. The slab 362 is illustrated in FIGURE 11 as having rounded edges 366 and also illustrated in FIGURE 10 as having rounded edges. The slab 362 is converted into lumber or a cant 370 upon leaving the side chippers 38 and 40.

In FIGURE 13 there is illustrated the cutting of the cant 370 into smaller size cants by edger saws 42 and 44.

In FIGURE 14 there is illustrated the cant 370 before it passes through the saws 42 and 44.

In FIGURE 15 there is illustrated the pieces of lumber 372, 374 and 376 which leave the saws 42 and 44. For example, the cant 370 may be a piece of two-by-ten (2" x 10") and upon passing through the saws 42 and 44 may be converted into two two-by-twos (2" x 2") and a two-by-six (2" x 6"). It is to be realized that the lumber 370 may be cut into many different sizes depending upon the original size of 370 and the desired product.

In FIGURE 16 is illustrated in a plan view an arrangement for moving both side chipper heads to accommodate various sizes of wood slabs. So far as consistent with each other the same reference numerals will be used for the same or similar part in FIGURES 2 and 16. The chipper head 40 in FIGURE 16 is moved as previously described for FIGURE 2. The chipper head 38 in FIGURE 16 is moved by means similar to the means used for moving chipper head 40. The chipper head 38 is connected by a bolt 430 to a stub arm 432. The stub arm 432 connects with an arm 434. The arms 432 and 434 are at right angles to each other. The arm 434 connects with a plunger 436. The plunger 436 is part of the pneumatic or hydraulic cylinder 438. The cylinder 438 is in a back-to-back relationship with cylinder 440. A plunger 442 connects cylinder 440 with a cylinder 444. The cylinder 444 is in a back-to-back relationship with a cylinder 446. The cylinder 446 connects by means of a plunger 448 with an arm 450. The arm 450 is integral with the side 36. The cylinder 438 may have a one (1″) inch stroke; 440 may have a two (2″) inch stroke; 444 may have a three (3″) inch stroke; and, 446 may have a four (4″) inch stroke. By extending the cylinders in various combinations it is possible to move this chipper 38 a maximum of ten inches.

In FIGURES 18, 19 and 20 there is illustrated a means for locking the chipper heads in position. This means is part of the apparatus 20 and 310. It is not shown in FIGURES 1, 2, 3, 4, 5 and 6 because of the small scale of these drawings. In FIGURE 18 it is seen that there is a gib 46 having a triangular wedge 49 in cross-section. There is a follower plate 460 having a triangular recess or groove 462 on each side for receiving the wedge 49. It is seen that on the right wedge 49 there is an upper skid plate 464 and a lower skid plate 466. These skid plates are attached to the gib by means of bolts screwed in tapped holes in the gibs. It is seen that on the left gib 48 that there is an upper skid plate 468. This plate 468 in attached to the upper face of the wedge by means of a bolt screwed in a tapped hole in the upper face of the wedge. Between the lower face of the left wedge 49 and the follower plate 460 there is a block or wedge 470. This wedge 470 is connected by means of a bolt 472 to an adjustable arm 474. The adjustable arm 474 connects by means of a bolt 476 with an arm 478 of a bell crank 480. The bell crank 480 is on a pivot rod 482, and has another arm 484. The arm 484 is pinned at 486 to a plunger 488. The plunger 488 is part of the cylinder 490, a pneumatic or hydraulic cylinder having pressure lines. In the follower plate 460 there is a passageway, see FIGURE 19. In this passageway there is a pivot rod 482. On the other end of the pivot rod 482 there is an arm 481 which connects with the block 470. Mounted on the follower plate 460 is an electric motor 494. A shaft 496 depends from this motor. On the lower end of this shaft there is a chipper head 498. A shroud 500 may surround the chipper head.

It is readily seen that to move the chipper head that the plunger 488 may be retracted. The wedge 470 is removed from close contact with the gib 48. As a result the follower plate 460 is no longer in close contact with the gibs 46 and is free to be moved to a new position. After being moved to the new position the plunger 488 is extended and the wedge 470 is forced between the follower plate 460 and the gib 46. In fact, the follower plate is forced in a tight friction fit with all of the skid plates 464, 466 and 468. As a result the follower plate 460 is locked in position.

Having described my invention it is to be realized that the invention may comprise two side chipper heads and which chipper heads are movable for accommodating various size slabs; the combination of two side chipper heads and one saw in which chipper heads are movable for accommodating various size slabs and which saw is movable; the combination of two side chipper heads and two or more saws with both the said chipper heads being movable and said saws being movable to accommodate different size slabs; three chipper heads comprising in combination two side chipper heads and a top chipper head, said side chipper heads for removing the wane edge and said top chipper head for the rounded slab portion with the reservation that the side chipper heads may be vertically placed and the top chipper head horizontally placed; the combination of three chipper heads and a saw with two of the chipper heads being side chipper heads and one a vertical chipper head with the side chipper heads for removing the wane edge and the vertical chipper head for removing the top rounded portion with the reservation that said side chipper heads are movable and may be in a vertical plane while the top chipper head may be movable in a horizontal plane and that the side chipper heads may be movable and also that the saw may be movable; and, the combination of three chipper heads and two or more saws with two of the chipper heads being side chipper heads and a third chipper head being a top chipper head and with the reservation that the two side chipper heads are movable and may be in a vertical plane and the top chipper head being movable and in a horizontal plane and that the two or more saws may be movable so as to accommodate various size slabs.

Having presented my invention what I claim is:

1. A top chipper and side chipper and edger comprising in combination two spaced-apart side chippers, a top chipper and a saw, each of said side chippers being mounted on a vertical shaft and each of said side chippers rotating on a horizontal plane, means to vary the spacing between the vertical shaft on which the side chippers are mounted so as to vary the spacing between the side chippers for accommodation of the various size pieces of wood, each of said side chippers having a motor, a gear train interconnecting the two side chippers and so geared that the chipper teeth of the two side chippers contact the slab of wood substantially simultaneously, a horizontal shaft, said top chipper being mounted on said horizontal shaft for removing chips of wood from said slab of wood, at least one of said side chippers being mounted so that the vertical shaft is on a follower plate, and said horizontal shaft is on a follower plate, gibs for holding and guiding said follower plates, said gibs and said follower plates mating with each other for both the vertical shaft and the horizontal shaft, a wedge between said gibs and said follower plate, a means to move the wedge between said gibs and said follower plate to vary the friction between the follower plate and the gibs to allow freedom of movement of the follower plate and to firmly position the follower plate with respect to the gibs, and a horizontal shaft on which the saw is mounted, said saw cutting in a vertical plane, and means to vary the position of the saw for various size pieces of wood, and said chipper rotating so that the teeth of the chipper cut the wood in the direction of the flow of the wood and not against the direction of the flow of the wood, and a non-overrunning feed mechanism for restricting the velocity with which said wood moves through the top chipper and side chipper and edger.

2. A side chipper having a chipper tooth and being rotary comprising in combination:
 (a) a first chipper having a chipper tooth and being rotary;
 (b) a second chipper having a chipper tooth and being rotary;
 (c) said first chipper and said second chipper being spaced apart;
 (d) a first fluid actuated cylinder and plunger connecting with the first chipper;
 (e) a second fluid actuated cylinder and plunger connecting with the second chipper;
 (f) a first motor connecting with and driving the first chipper;
 (g) a second motor connecting with and driving the second chipper; and,
 (h) a gear train interconnecting the first and the second motor and so geared that the chipper teeth of the first and the second chipper contact a slab of wood substantially simultaneously.

3. A top chipper and side chipper in combination comprising:
  (a) two spaced apart side chippers and each chipper having a chipper tooth and being rotary;
  (b) means to quickly move the side chippers with respect to each other so as to vary the spacing between the two side chippers for accommodation of different size slabs of wood;
  (c) said means comprising appropriate linkage connecting with each chipper;
  (d) a plunger connecting with the appropriate linkage;
  (e) means to move quickly the plunger;
  (f) a top chipper;
  (g) appropriate linkage connecting with the top chipper and a plunger connecting with the appropriate linkage;
  (h) a first motor connecting with and driving the first chipper;
  (i) a second motor connecting with and driving the second chipper; and
  (j) a gear train interconnecting the first and the second motor and so geared that the chipper teeth of the first and the second chipper contact a slab of wood substantially simultaneously.

4. A side chipper comprising in combination:
  (a) a first gib having in a lateral cross-sectional view a triangular configuration;
  (b) a second gib having in a lateral cross-sectional view a triangular configuration;
  (c) said first and second gibs being in a spaced apart relation with the triangular portions facing each other;
  (d) a first follower plate positioned between the first and second gibs having on each opposed edge a triangular recess to mate with the first and the second gibs;
  (e) a second follower plate positioned between the first and second gibs having on each opposed edge a triangular recess to mate with the first and the second gibs;
  (f) skid plates between the second gib and the first and the second follower plates;
  (g) a skid plate between the first gib and the first follower plate;
  (h) a skid plate between the first gib and the second follower plate;
  (i) a wedge between the first gib and the first and the second follower plates;
  (j) a first plunger connecting with the wedge;
  (k) means to quickly move the plunger;
  (l) a first chipper mounted on the first follower plate;
  (m) a second chipper mounted on the second follower plate;
  (n) a second plunger connecting with the first follower plate;
  (o) means to quickly move the second plunger;
  (p) a third plunger connecting with the second follower plate; and,
  (q) means to quickly move the third plunger.

5. A side chipper comprising in combination:
  (a) a first gib having in a lateral cross-sectional view a triangular configuration;
  (b) a second gib having in a lateral cross-sectional view a triangular configuration;
  (c) said first and second gibs being in a spaced apart relation with the triangular portions facing each other;
  (d) a first follower plate positioned between the first and second gibs having on each opposed edge a triangular recess to mate with the first and the second gibs;
  (e) a second follower plate positioned between the first and second gibs having on each opposed edge a triangular recess to mate with the first and the second gibs;
  (f) skid plates between the second gib and the first and the second follower plates;
  (g) a skid plate between the first gib and the first follower plate;
  (h) a skid plate between the first gib and the second follower plate;
  (i) a wedge between the first gib and the first and the second follower plates;
  (j) a first fluid actuated cylinder and plunger connecting with the wedge;
  (k) a first chipper mounted on the first follower plate;
  (l) a second chipper mounted on the second follower plate;
  (m) a second fluid actuated cylinder and plunger connecting with the first follower plate; and,
  (n) a third fluid actuated cylinder and plunger connecting with the second follower plate.

6. A top chipper and side chippers in combination, comprising:
  (a) a first gib having in a lateral cross-sectional view a triangular configuration;
  (b) a second gib having in a lateral cross-sectional view a triangular configuration;
  (c) said first and second gibs being in a spaced apart relation with the triangular portions facing each other;
  (d) a first follower plate positioned between the first and second gibs having on each opposed edge a triangular recess to mate with the first and the second gibs;
  (e) a second follower plate positioned between the first and second gibs having on each opposed edge a triangular recess to mate with the first and the second gibs;
  (f) skid plates between the second gib and the first and the second follower plates;
  (g) a skid plate between the first gib and the first follower plate;
  (h) a skid plate between the first gib and the second follower plate;
  (i) a wedge between the first gib and the first and the second follower plates;
  (j) a first fluid actuated cylinder and plunger connecting with the wedge;
  (k) a first chipper mounted on the first follower plate;
  (l) a second chipper mounted on the second follower plate;
  (m) a second fluid actuated cylinder and plunger connecting with the first follower plate;
  (n) a third fluid actuated cylinder and plunger connecting with the second follower plate;
  (o) a third gib having in a lateral cross-sectional view a triangular configuration;
  (p) a fourth gib having in a lateral cross-sectional view a triangular configuration;
  (q) said third and fourth gibs being in a spaced apart relation with the triangular portions facing each other;
  (r) a first follower plate positioned between the third and the fourth gibs having on each opposed edge a triangular recess to mate with the third and the fourth gibs;
  (s) skid plates between the third gib and the third follower plate;
  (t) a skid plate between the fourth gib and the third follower plate;
  (u) a wedge between the fourth gib and the third follower plate; and,
  (v) a third fluid actuated cylinder and a plunger connecting with the wedge between the fourth gib and the third follower plate.

7. A top chipper and side chippers and edger in combination, comprising:
  (a) a first gib having in a lateral cross-sectional view a triangular configuration;
  (b) a second gib having in a lateral cross-sectional view a triangular configuration;

(c) said first and second gibs being in a spaced apart relation with the triangular portions facing each other;
(d) a first follower plate positioned between the first and second gibs having on each opposed edge a triangular recess to mate with the first and the second gibs;
(e) a second follower plate positioned between the first and second gibs having on each opposed edge a triangular recess to mate with the first and the second gibs;
(f) skid plates between the second gib and the first and the second follower plates;
(g) a skid plate between the first gib and the first follower plate;
(h) a skid plate between the first gib and the second follower plate;
(i) a wedge between the first gib and the first and the second follower plates;
(j) a first fluid actuated cylinder and plunger connecting with the wedge;
(k) a first chipper mounted on the first follower plate;
(l) a second chipper mounted on the second follower plate;
(m) a second fluid actuated cylinder and plunger connecting with the first follower plate;
(n) a third fluid actuated cylinder and plunger connecting with the second follower plate;
(o) a third gib having in a lateral cross-sectional view a triangular configuration;
(p) a fourth gib having in a lateral cross-sectional view a triangular configuration;
(q) said third and fourth gibs being in a spaced apart relation with the triangular portions facing each other;
(r) a first follower plate positioned between the third and the fourth gibs having on each opposed edge triangular recess to mate with the third and the fourth gibs;
(s) skid plates between the third gib and the third follower plate;
(t) a skid plate between the fourth gib and the third follower plate;
(u) a wedge between the fourth gib and the third follower plate;
(v) a third fluid actuated cylinder and a plunger connecting with the wedge between the fourth gib and the third follower plate;
(w) a saw; and,
(x) means to move the saw for cutting various pieces of wood.

References Cited

UNITED STATES PATENTS

| 328,794 | 10/1885 | Lhote | 144—39 |
| 1,825,041 | 9/1931 | Babare | 144—39 |
| 1,858,898 | 5/1932 | Mesker | 51—240 |
| 1,893,016 | 1/1933 | Brown | 144—117 |
| 2,571,861 | 10/1951 | Gegumis | 144—36 |
| 3,082,802 | 3/1963 | Dickson et al. | 144—326 |
| 3,125,141 | 3/1964 | Best et al. | 144—116 |

FOREIGN PATENTS 567,994  12/1958  Canada.

HAROLD D. WHITEHEAD, Primary Examiner.

WILLIAM W. DYER, ROBERT C. RIORDON, LESTER M. SWINGLE, L. S. SELMAN, Assistant Examiners.